United States Patent [19]

Lenz et al.

[11] Patent Number: 5,129,492
[45] Date of Patent: * Jul. 14, 1992

[54] STEERING COLUMN MOUNTED HAND CONTROL

[75] Inventors: Craig R. Lenz, Regina; Scott B. Grams, Weyburn, both of Canada

[73] Assignee: Contact Technologies Inc., Weyburn, Canada

[*] Notice: The portion of the term of this patent subsequent to Jun. 25, 2008 has been disclaimed.

[21] Appl. No.: 664,718

[22] Filed: Mar. 5, 1991

[51] Int. Cl.⁵ ............... F02D 9/06; G05G 11/00
[52] U.S. Cl. .................... 192/1.52; 74/481
[58] Field of Search ............ 74/481, 482; 192/1.52

[56] References Cited

U.S. PATENT DOCUMENTS

| | | | |
|---|---|---|---|
| 2,724,285 | 11/1955 | Lerman | 192/1.52 X |
| 2,777,335 | 1/1957 | Engberg et al. | 74/481 |
| 2,855,797 | 10/1958 | Dunn | 192/1.52 X |
| 3,373,628 | 3/1958 | Lake et al. | 74/484 |
| 3,442,149 | 5/1959 | Schwendenmann | 74/481 |
| 3,472,094 | 10/1969 | Lake et al. | 74/481 |
| 4,424,723 | 1/1984 | Gockel | 74/482 |
| 4,438,835 | 3/1984 | Dowden et al. | 192/3 M |
| 4,476,954 | 10/1984 | Johnson et al. | 180/333 |
| 4,788,879 | 12/1988 | Ulrich | 74/481 |
| 4,998,983 | 3/1991 | Ruprecht et al. | 74/481 X |

FOREIGN PATENT DOCUMENTS

| | | |
|---|---|---|
| 1005731 | 2/1977 | Canada . |
| 0069090 | 1/1983 | European Pat. Off. . |
| 1480333 | 1/1970 | Fed. Rep. of Germany . |
| 1539880 | 2/1979 | United Kingdom . |

*Primary Examiner*—Allan D. Herrmann
*Assistant Examiner*—David W. Laub
*Attorney, Agent, or Firm*—Bereskin & Parr

[57] ABSTRACT

A hand control device is provided for operating the accelerator and brake controls of a motor vehicle. The device comprises a brake control member and an accelerator control member, mounting clamps connected to one end of each member for securing the members to a respective control, a handle member pivotally connected to the other end of each control member, and a flexible support loop passing around the vehicle steering column for receiving and supporting one of the control members. Rotation of the handle member in a first direction, with the connection between the handle member and the accelerator control member acting as a fulcrum, operates the brake control. Rotation of the handle member in a second direction opposite to the first direction, with the connection member between the handle member and the brake control member acting as a fulcrum, operates the accelerator control.

21 Claims, 2 Drawing Sheets

STEERING COLUMN MOUNTED HAND CONTROL

FIELD OF THE INVENTION

This invention relates to a hand control device for operating the accelerator and brake controls of a motor vehicle, and in particular to a hand control device which is supported by the steering column of a vehicle. The invention is a development of a hand control device described in the commonly owned co-pending U.S. patent application Ser. No. 07/437,158, filed Nov. 16, 1989, now U.S. Pat. No. 5,025,905 the disclosure of which is herein incorporated by reference.

BACKGROUND OF THE INVENTION

Conventional motor vehicles incorporate foot controls, a typical motor vehicle with an automatic gearbox having accelerator and brake pedals. To permit operation by disabled persons having restricted or no use of their legs, such vehicles may be fitted with hand controls which permit hand operation of the accelerator and brake pedals.

Only a small number of specially adapted cars have been produced for disabled drivers, the majority of drivers using conventional vehicles which have been fitted with hand controls as described above.

The majority of hand controls which have been considered previously utilize systems of levers and push rods of varying complexity, and the below-listed patents include descriptions of various different hand controls of this form:

U.S. Pat. No. 2,855,797 to Dunn, Jr.
U.S. Pat. No. 2,777,335 to Engberg et al
U.S. Pat. No. 3,373,628 to Lake et al
U.S. Pat. No. 3,442,149 to Schwendenmann
U.S. Pat. No. 3,472,094 to Lake et al
U.S. Pat. No. 4,424,723 to Gockel
U.S. Pat. No. 4,438,835 to Dowden, deceased et al
U.S. Pat. No. 4,788,879 to Ulrich
Canadian Patent No. 1,005,731 to T. Mitro
European Patent Application 0 069 090 to G. Venturini
U.K. Patent No. 1,539,880 to E. Aston
German Offenlegungsschrift No. 1,480,333 to Turner.

In all but the Ulrich patent, in which it appears that the operator of the apparatus must support the weight of the apparatus, the devices are rigidly attached to the vehicle structure. In Schwendenmann the control is fixed to the vehicle firewall and in Dowden the control is bolted to the vehicle floor. In the other documents, the disclosed controls are attached to the vehicle's steering column. In the lever-operated controls, as disclosed by Engberg, Dunn, Gockel and Mitro, the rigid mounting to the steering column is required as, in all cases, the control lever, which operates one or more of the pedals of the vehicle, pivots about a fulcrum provided on the steering column mounting. Various mounting methods are disclosed, including the use of hose clamps in Engberg, U-bolts in Dunn and a bracket which is screwed to the steering column in Mitro.

While such methods of mounting a control may be acceptable for controls which are to be used over an extended period, they would be unacceptable for short term or temporary use as permanent modification of the vehicle would likely be required. Most modern vehicles include mouldings around the steering column accommodating the steering lock, switch gear and wiring and the mouldings would likely require extensive and expensive modification to permit the provision of a secure mounting, as described in the above-mentioned patents.

SUMMARY OF THE INVENTION

According to one aspect of the present invention there is provided a hand control device for operating the accelerator and brake controls of a motor vehicle comprising a brake control member and an accelerator control member, mounting means connected to one end of each control member for securing the members to a respective control, a handle member pivotally connected to the other end of each control member and a flexible support loop for passing around a vehicle steering column for receiving and supporting one of the control members. Rotation of the handle member in a first direction, with the connection between the handle member and the accelerator control member acting as a fulcrum, operates the brake control. Rotation of the handle member in a second direction opposite to said first direction, with the connection between the handle member and the brake control member acting as a fulcrum, operates the accelerator control.

Preferably, the handle member is pivotally connected to the accelerator control member at one end portion, pivotally connected to the brake control member at an intermediate portion, and provided with an operator grip at the other end portion, whereby pushing the grip towards the controls operates the brake control and pulling the grip away from the controls operates the accelerator control.

A control member receiving loop or eyelet may be provided and be mounted on the support loop to slidably receive one of the control members.

Preferably also, a flexible accelerator retention member is provided for extending between the vehicle structure and the accelerator control member to limit the movement of the member and thus of the accelerator control, particularly when the accelerator control is being pulled by the respective control member as the device is being used to apply the brake control. Most preferably, the accelerator retention member extends between the firewall of the vehicle and the handle member end of the accelerator control member.

A flexible brake retention member may also be provided for extending between one of the brake control member mounting means or the brake control member and the vehicle structure. Preferably, the brake retention member is attached to the vehicle structure by means of the support loop and is attached, at the other end, to the brake control mounting means. Most preferably, the retention member includes a tensioned spring to exert a pull on the brake control. The tension in the brake retention member created by the spring is intended to hold the brake control upward such that, for example, when the vehicle passes over a bump in the road the brake control does not move downwardly to activate the rear brake warning lights or deactivate the vehicle "cruise control".

BRIEF DESCRIPTION OF THE DRAWINGS

A preferred embodiment of the present invention will now be described, by way of example, with reference to the accompanying drawings, in which.

DETAILED DESCRIPTION OF THE DRAWINGS

The figures illustrate a steering column mounted hand control 10 mounted on a motor vehicle 12. For ease of understanding, the vehicle is shown in somewhat simplified form.

Figure 1:
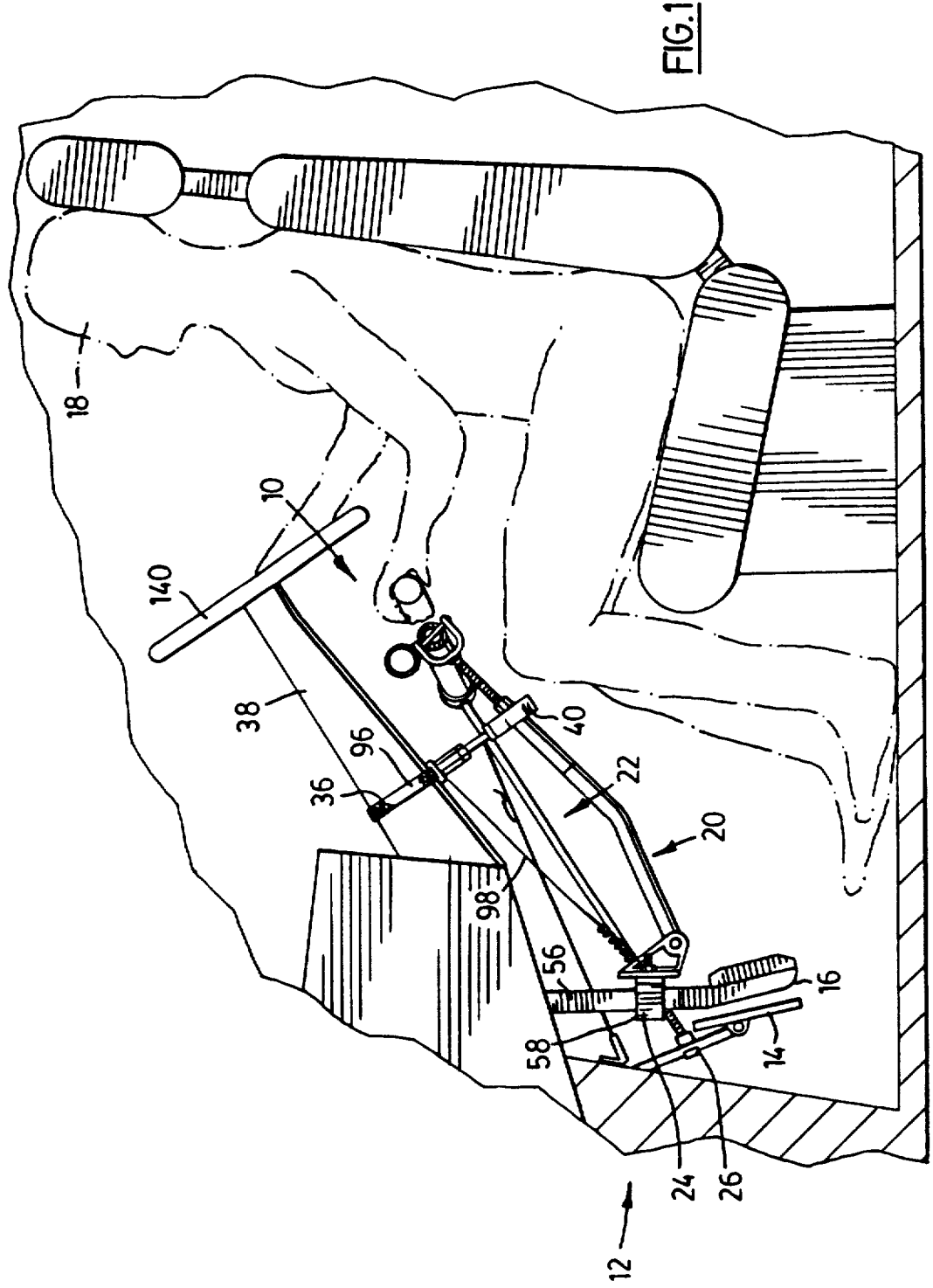
FIG. 1 is a side view of the driver's area of a motor vehicle provided with a steering column mounted hand control in accordance with a preferred embodiment of the present invention.
Figure 2:
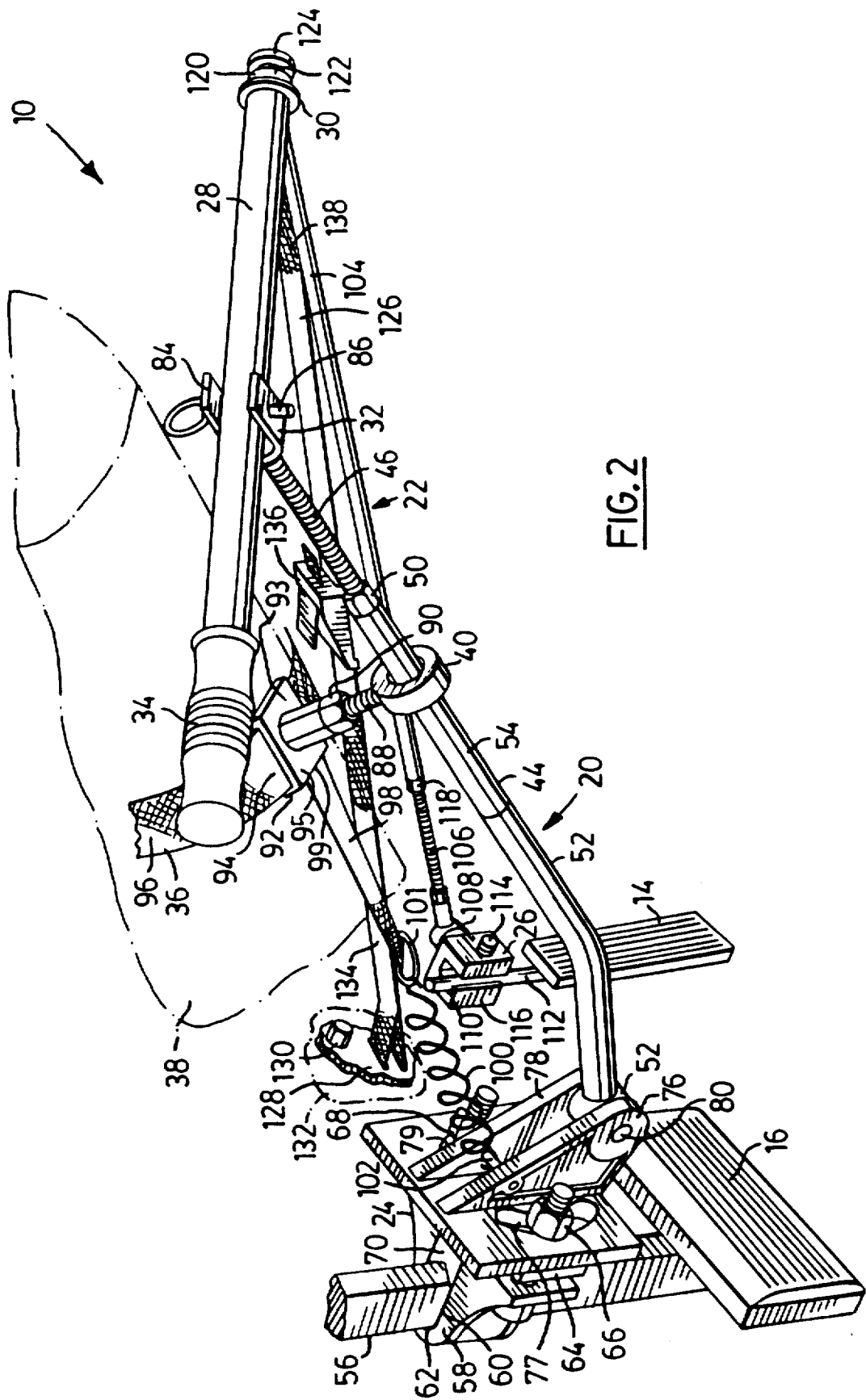
FIG. 2 is a perspective view of the steering column mounted hand control of FIG. 1, shown enlarged.

A general intention is that the control 10 may be utilised by persons having no or restricted use of their lower body and permits hand operation of a motor vehicle provided with an automatic gear box, that is, a vehicle having only two foot controls or pedals; an accelerator pedal 14 and a brake pedal 16. The figures illustrate a typical application on a left hand drive vehicle, with the control 10 positioned to allow operation of the accelerator 14 and brake 16 by the left hand of the operator 18 (FIG. 1).

The general operation of the control 10 will first be described, followed by a more detailed description of the individual elements of the control. This will be followed, in turn, with a description of the steps involved in the installation of a control 10 in a vehicle.

The control 10 comprises a brake control member and an accelerator control member, both in the form of rods 20, 22. Mounting means in the form of clamps 24, 26 are provided to secure ends of the rods 20, 22 to the respective accelerator and brake controls 14, 16. A handle member 28 is pivotally connected to the other end of each rod, 20, 22 such that rotation of the handle member 28 in a first direction, with the connection 30 between the handle member 28 and the accelerator control rod 22 acting as a fulcrum, operating the brake 16, and rotation of the handle member 28 in a second direction opposite to the first direction, with the connection 32 between the handle member and the brake control rod 20 acting as a fulcrum, operation the accelerator 14. In the illustrated embodiment, the handle member 28 is pivotally connected to the accelerator control rod 22 at one end, pivotally connected to the brake control rod 20 at an intermediate portion, and provided with a cushioned operator grip 34 at the other end portion, such that pushing the grip 34 towards the accelerator and brake 14, 16 operates the brake 16, and pulling the grip 34 away from the accelerator and brake operates the accelerator 14.

The weight of the "free" ends of the brake and accelerator rods 20, 22 and the handle member 28 are supported by a flexible support loop 36 for passing around the vehicle steering column 38. The loop 36 includes a portion for receiving and supporting one of the control rods, and in this example, the brake control rod 20 passes through a supporting eyelet 40.

The brake control rod 16 is in two parts, a partially tubular female part 44 and a male part in the form of an adjustment rod 46. The two parts provide a means for adjusting the length of the control rod 16. The rod 46 is provided with an external left handed screw thread for engaging a complementary thread in the end of the female part 44. A locking nut 50 is provided for fixing the part 44 and rod 46 relative to one another. The female part 44 of the rod 16 is formed of a lower brake control arm 52 and an upper brake control arm 54, the lower arm 52 being attached to the clamp 24 and the upper arm 54 engaging the adjustment rod 46. The arms 52, 54 are joined by means of a threaded connection (not shown), again provided with cooperating left hand threads. The two part female part 44 allows the form of the rod 20 to be varied to suit the configuration of particular vehicles; the illustrated lower brake control arm 52 is substantially straight, but an offset control arm may be provided for use in vehicles where the alignment of the brake pedal 16 and the steering column 38 are different as it is generally desirable to have the connection 32 between the brake control rod 20 and the handle member 28 directly below the steering column 38.

The upper end of the brake adjustment rod 46 is provided with a clevis 84 and a removable pivot pin 86, the handle member 28 being located in the clevis 84 and the pin 86 passing through a bore in the member 28, provided with a plastic grommet, such that the member 28 may pivot relative to the control rod 20.

The brake clamp 24 provides a pivotal connection between the brake control rod 20 and the stalk of the brake pedal 56 and includes a mounting block 58 defining a channel 60 with a base 62 for engaging the rear face of the stalk 56. A wedge block 64 is attached to the mounting block 58 by a pair of bolts 66, 68 and has a portion 70 for extending into the channel 60 and engaging the opposite face of the stalk 56. The stalk engaging face of the portion 70 defines a shallow V-shaped groove such that the block 64 is centred on the stalk 56. Mounted to the front face of the wedge block 64, also by means of the bolts 66, 68, is a swivel plate 74 including a pair of spaced webs 76, 78. The plate 74 is provided with a crescent-shaped openings 77, 79 to receive the bolts, to permit limited rotation of the plate 74, relative to the blocks 58, 64. A pivot pin 80 extends between the webs and provides a pivotal mounting for the lower brake arm 52, the end of which is provided with a pivot connection 82.

As mentioned above, the brake control rod 20 passes through an eyelet 40 which is mounted on the support loop 36 attached to the vehicle steering column 38, the rod 20 being configured such that, during operation, the upper brake control arm 54 will be positioned in the eyelet 40. The eyelet 40 is mounted on a threaded post 88 which engages a larger, internally threaded post 90 extending from a halter or support plate 92 held against the underside of the steering column 38 by the support loop 36. Padding 94 is provided on the support plate 92 where it engages the steering column 38.

The support loop 36 is in the form of a flexible strap extending from an aperture 93 to one side of the plate 92 and having a free end which is threaded through an aperture 95 in the other side of the plate after the strap 96 has been passed over and around the steering column 38. The support loop 36 includes a means for adjusting the length of the loop. For instance the end surfaces of the strap 96 may be provided with hook and loop surface tape, such as that sold under the VELCRO trademark, such that the free end of the strap may be easily and securely fastened to the portion of the strap which engages the steering column 38.

A further strap 98 is attached to an aperture 99 the pedal side of the plate 92 to a spring 100, through a D-shaped ring 101 which is attached to a pin 102 extending between the webs 76, 78 on the swivel plate 74. The strap 98 is, like the strap 96, provided with hook and loop surface areas such that the length of the strap 98 may be easily and quickly adjusted. The strap 98 and spring 100 are intended to put a light tension on the brake pedal 16 such that when the vehicle is travelling with the accelerator pedal 14 depressed and the vehicle, for example, passes over a bump in the road, the brake pedal 16 is less likely to be pushed downwardly and possibly cause illumination of the rear brake warning lights or deactivate the vehicle cruise control. It should be noted that in vehicles not provided with cruise control and having a less sensitive brake warning light activation switches, it may not be necessary to provide the brake retention strap 98. It should also be noted, that, when fitted, the spring 100 should be sufficiently light that it does not impair the braking function by providing any significant resistance to the brake pedal 16 being depressed.

The accelerator control rod 22 also has a female part in the form of an upper accelerator control arm 104 and a male part in the form of a lower accelerator arm 106 the two parts provide a means for adjusting the length of the control rod 22. The upper accelerator control arm 104 has an internal right-handed thread to engage a corresponding external thread on the lower arm 106. Thus, the length of the accelerator control rod 22 is adjusted by rotating the upper accelerator control arm 104 relative to the lower accelerator arm, a locknut 118 being provided to fix the arms 104, 106 relative to one another.

The accelerator clamp 26 is attached to the lower accelerator arm 106 through a ball joint 108 and is provided with an open channel 110, on the opposite side of the arm 26 from the ball joint 108, to receive the stalk 112 of the accelerator pedal 14. The clamp 26 is fixed to the stalk 112 by means of a threaded pin 114, with an allen key head which bears against a surface of the stalk 112, while the opposite side of the stalk 112 is engaged by an opposing wall of the channel 110. Threaded apertures are provided in both sides of the clamp 26, and the wall of the channel 110 are of different configurations, one being flat and the other being concave.

The upper end of the upper accelerator arm 104 is provided with a ball joint 120 having an aperture to receive a tapered pin 122 which extends from the end of the handle member 28. A resilient stopper 124 retains the arm 104 on the pin 122.

To limit the pulling force which is applied to the accelerator pedal 16 when the control 10 is being used to apply the brake pedal 16, an accelerator retention strap 126 is provided and extends from the upper end of the upper accelerator control arm 104 to a mounting buckle or plate 128 which is bolted to the firewall 132 of the vehicle. The strap 126 is in two parts, a lower part 134 being provided with a buckle 136 for clasping the end of the upper part 138. The free end of the upper part 138 is also provided with hook and loop surface to allow any overlapping length to be secured to the main strap.

For further clarification of the features and operation of the control 10, an installation of the control 10, when supplied as a kit of parts, will now be described. It will of course be clear that this description is merely exemplary, and innumerable other fitting steps could be followed.

The lower part 134 of the accelerator retention strap 126 is first attached to the vehicle firewall 132, and may utilize any suitable bolt 130 located behind the brake or accelerator pedal. Once a bolt 130 has been located, it is removed and then inserted through the eyelet in the strap mounting plate 138 and replaced tightly into the firewall.

The mounting block 58 of the brake clamp 24 is then fitted on the rear of the brake pedal stalk 56. While holding the mounting block 58 in place, the wedge block 64 is set over the bolts 66, 68, with the portion 70 in the channel 60, and the swivel plate 74 then located on top of the wedge block 64. The swivel plate 74 is adjusted until the plate 74 is parallel with the brake pedal 16. As may be seen from the drawings, the brake clamp 24 should be installed well above the brake pedal 16 such that the clamp 24 does not interfere with normal operation of the vehicle by operators having the use of their legs. The swivel plate 74 is then held loosely in position by locating appropriate nuts on the bolts 66, 68. Preferably, flat and lock washers are also provided on the bolts.

The lower accelerator arm 106 is next mounted on the stalk 112 on the accelerator pedal 14. It is first necessary to determine if the stalk 112 has a round or square cross section. If the stalk 112 is square, the pin 114 is threaded through the concave wall of the channel 110 to push the stalk 112 against the flat wall. If the stalk is round, the pin 114 is passed through the other wall 116. The clamp 26 is located on the stalk 112 far enough up the stalk 112 such that it does not interfere with normal pedal movement but low enough such that the clamp 26 does not rub against the vehicle dashboard. When the accelerator pedal 14 is fully depressed the clamp 26 should not touch the firewall.

Next, the lower brake arm 52 is mounted on the swivel plate 74 simply by removing the pivot pin 80, locating the pivot connection 82 of the arm 52 between the web 76, 78 and then reinserting the pin 80, which is tightened to the point where the arm 52 is free to move in a vertical arc but cannot be moved from side to side. As mentioned above, if the brake pedal 16 is not in line with the steering column an offset brake arm is used.

The next step is the installation of the upper accelerator control arm 104, which is threaded over the end of the lower accelerator arm 106. The upper arm 104 is threaded onto the lower arm 106 until the upper end of the arm 104 is located approximately below the separation of the steering wheel 140 and the steering column 38.

Following this, the support strap 126 is located on the steering column, and normally as close to the vehicle dashboard as possible. The eyelet 40 is screwed into the post 90.

The upper brake arm 54 is then inserted through the eyelet 40 and threaded onto the lower brake control arm 52, bearing in mind that a left hand thread is used. The position of the swivel plate 74 may be adjusted at this point to assure that the lower part 42 of the rod is centered with the steering column 38. When the correct position is found, the nuts are tightened on the bolts 66, 68. The brake 16 should then be fully depressed to test the brake arm travel, and the upper end of the upper brake arm 54 should remain above the eyelet 40. If the arm 54 drops through the eyelet 40 a longer arm 54 is required.

The upper adjustment rod 46 is then threaded into the upper brake arm 54 until the clevis 84 is directly beneath the separation of the steering wheel 140 and the steering column 38. At this point the lock nut 50 is tightened to fix the length of the brake rod 20. The pin 86 is then removed and the handle member 24 placed in the clevis 84. The pin 86 is then reinserted from top to bottom, through the plastic grommet in the member 28. The ball joint 120 on the upper end of the accelerator control rod 22 is then located on the pin 122 at the end of the handle member 28. The operator grip 34 is then pressed towards the pedals and the length of the accelerator control rod 22 adjusted until the grip 34 is at a comfortable location throughout its range of travel. If the handle member 28 comes into contact with the steering wheel 140, the accelerator control rod 22 should be lengthened. The handle member 28 should also preferably be parallel to the floor.

The accelerator retention strap 126 is attached and tightened, care being taken not to tighten the strap too far, which will cause the engine to idle too fast. The brake retention strap is then fitted by passing the strap through the appropriate slot 95 in the support plate 92 and also through the D-ring 101 on the spring 100.

Before using a vehicle provided with the control 10, it is advisable to check that the accelerator retention strap is absorbing all of the force when applying the brake, by pushing the brake down fully; there should be no stress on the accelerator stalk 112.

A vehicle may thus be fitted with the control without requiring any permanent modification to the vehicle structure. Once fitted, the vehicle may still be operated in the normal manner.

It will be clear to those of skill in the art that the above description is merely exemplary, and that various modifications and amendments may be made without departing from the scope and spirit of the invention.

We claim:

1. A hand control device for operating the accelerator and brake controls of a motor vehicle, where the vehicle has a steering column, said hand control device comprising:
   a brake control member and an accelerator control member;
   a brake control member mounting means and an accelerator control member mounting means, each said mounting means being connected to one end of each said control member for securing said control members to a respective control;
   a flexible support loop for passing around the vehicle steering column and including a control member retaining portion for receiving and supporting one of the control members, while permitting relative movement therebetween; and
   a handle member pivotally connected to the other end of each control member, rotation of the handle member in a first direction, with a connection between the handle member and the accelerator control member acting as a fulcrum, operating the brake control, and rotation of the handle member in a second direction opposite to said first direction, with the connection between the handle member and the brake control member acting as a fulcrum, operating the accelerator control.

2. The hand control device of claim 1, wherein the handle member is pivotally connected to one of the control members at one end portion, pivotally connected to the other control member at an intermediate portion and provided with an operator grip at the other end portion.

3. The hand control of claim 1, which includes a means for adjusting the lengths of the control members.

4. The hand control member of claim 1, wherein each control member is in two parts, an at least partially tubular female part and a male part, an end portion of the male part being received by a female part, and locking means being provided for locking the parts in fixed relation and thus fixing the lengths of the respective control members.

5. The hand control device of claim 4, wherein the female part of the brake control member is attached to the brake control member mounting means and the male part of the accelerator control member is attached to the accelerator control member mounting means, the male part of each control member being provided with an external screw thread and the female part of each control member being provided with a complementary internal screw thread.

6. The hand control device of claim 5, wherein the thread direction of the screw threads on the accelerator and brake control members are opposite.

7. The hand control of claim 2, wherein a pivot pin provides the connection between the brake control member and the handle member and a ball joint provides the connection between the accelerator control member and the handle member.

8. The hand control device of claim 1, wherein the brake control member mounting means includes a mounting block defining a channel having a base for engaging a face of a brake pedal stalk, and a wedge block for attachment to the mounting block and having a portion for extending into the channel for engaging an opposite face of the brake pedal stalk.

9. The hand control device of claim 8, wherein the brake control member mounting means further includes a swivel plate including a pivotal mounting for the brake control member and which swivel plate is mounted to the wedge block and includes means to vary the position of the swivel plate on the block to vary how the brake control member is aligned relative to the brake control.

10. The hand control device of claim 1, which includes a means for adjusting the length of the support loop to accommodate steering columns of different dimensions and configurations.

11. The hand control device of claim 1, further comprising a flexible accelerator retention member for extending between the accelerator control member and a fire wall of the vehicle to limit movement of the accelerator control when the handle member is rotated in a first direction to operate the brake control, and a flexible brake retention member for extending between the brake control member mounting means and the flexible support loop and including a spring portion to tension the brake retention member and thus place tension on the brake control.

12. The hand control device of claim 1, further comprising a flexible accelerator retention member for connection between the accelerator control member and the vehicle structure to limit movement of the accelerator control when the handle member is rotated in a first direction to operate the brake control.

13. The hand control device of claim 1, further comprising a flexible brake retention member for extending between the support loop and one of: the brake control member mounting means; the brake control member; and the vehicle structure.

14. The hand control device of claim 13, wherein the flexible brake retention member includes a tensioned spring portion to tension the member.

15. A hand control device of claim 1, wherein the control member retaining portion of the support loop slidably receives the brake control member.

16. The hand control device of claim 15, wherein the the control member retaining portion is mounted on a support plate adapted to be held against the underside of a vehicle steering column by the support loop.

17. The vehicle control device of claim 16, wherein the control member receiving portion is in the form of an eyelet provided with means for adjusting the spacing between the eyelet and the support plate.

18. The hand control device of claim 1, wherein the control members are pivotally mounted to the respective mounting means.

19. The hand control device of claim 1, wherein the mounting means are in the form of clamps for releasably engaging a stalk of each respective accelerator and brake pedals.

20. A hand control device for operating the accelerator and brake pedals of a motor vehicle, where the vehicle has a steering column, said hand control device comprising:
 a brake control rod and an accelerator control rod;
 clamps pivotally connected to one end of each control rod for securing the rods to the respective accelerator and brake pedals;
 a flexible support loop for passing around the vehicle steering column and including a portion for slidably receiving and supporting the brake control rod;
 a handle member pivotally connected to the accelerator control rod at one end portion, pivotally connected to the brake control member at an intermediate portion and provided with an operator grip at the other end portion, whereby pushing on the operator grip to rotate the handle member in a first direction, with the connection between the handle member and accelerator control rod acting as a fulcrum, operating the brake pedal, and pulling on the operator grip to rotate the handle member in a second direction opposite to first said direction, with the connection between the handle member and the brake control rod acting as a fulcrum, operating the accelerator pedal.

21. The hand control device of claim 20, further comprising a flexible accelerator retention strap for extending between the accelerator control rod and a fire wall of the vehicle to limit the movement of the accelerator pedal when the brake pedal is operated and a flexible brake retention strap for extending between the clamp for securing the brake control to the brake pedal and the flexible support loop and including a spring portion to tension the brake retention strap and thus apply a tension to the brake pedal.

* * * * *